US009882685B2

(12) United States Patent
Feygin et al.

(10) Patent No.: US 9,882,685 B2
(45) Date of Patent: Jan. 30, 2018

(54) WIRELESS COMMUNICATION SYSTEM WITH INTERFERENCE REJECTION MECHANISM AND METHOD OF OPERATION THEREOF

(71) Applicant: Samsung Electronics Co., Ltd., Suwon-si, Gyeonggi-Do (KR)

(72) Inventors: Gennady Feygin, San Diego, CA (US); Joongsuk Park, San Diego, CA (US); Vladislav Sorokine, Del Mar, CA (US); Inyup Kang, San Diego, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 129 days.

(21) Appl. No.: 14/188,559

(22) Filed: Feb. 24, 2014

(65) Prior Publication Data
US 2014/0273906 A1 Sep. 18, 2014

Related U.S. Application Data

(60) Provisional application No. 61/785,076, filed on Mar. 14, 2013.

(51) Int. Cl.
*H03D 3/22* (2006.01)
*H04L 27/22* (2006.01)
*H04L 1/20* (2006.01)

(52) U.S. Cl.
CPC ..................... *H04L 1/20* (2013.01)

(58) Field of Classification Search
CPC .................. H01L 2924/00; H01L 2224/45147
See application file for complete search history.

(56) References Cited

U.S. PATENT DOCUMENTS

| 6,577,855 | B1 | 6/2003 | Moore et al. |
| 6,707,858 | B1 | 3/2004 | Davie |
| 6,784,814 | B1 * | 8/2004 | Nair ................... H03M 1/0641 341/118 |
| 7,079,602 | B1 * | 7/2006 | Ikeda ................. H04L 27/2647 375/340 |
| 7,580,692 | B2 | 8/2009 | Kravets |
| 7,873,342 | B2 | 1/2011 | Lim et al. |

(Continued)

FOREIGN PATENT DOCUMENTS

EP 1834412 B1 6/2009

OTHER PUBLICATIONS

Lovalace, D. and Durec, J. A self calibrating quadrature generator with wide frequency range. Jun. 1997. Radio Frequency Circuits (RFIC) Symposium. pp. 147-151.

(Continued)

*Primary Examiner* — Chieh M Fan
*Assistant Examiner* — Gina McKie
(74) *Attorney, Agent, or Firm* — IP Investment Law Group

(57) ABSTRACT

A method of operation of a wireless communication system includes: filtering a composite input from a radio frequency signal; developing a raw digital stream by applying an analog correction to the composite input; sampling an extracted signal, from the raw digital stream, by a primary analog-to-digital converter; and monitoring, by a correction control block, the extracted signal including adjusting the analog correction by a digital control from the correction control block.

20 Claims, 8 Drawing Sheets

(56) References Cited

U.S. PATENT DOCUMENTS

| | | | |
|---|---|---|---|
| 8,249,543 B2 | 8/2012 | Tuttle et al. | |
| 9,742,593 B2* | 8/2017 | Moorti | H04L 25/03006 |
| 2003/0139167 A1* | 7/2003 | Ciccarelli | H03D 3/009 |
| | | | 455/324 |
| 2004/0233081 A1* | 11/2004 | Cesura | H03M 3/356 |
| | | | 341/118 |
| 2007/0047669 A1* | 3/2007 | Mak | H03D 3/007 |
| | | | 375/316 |
| 2010/0159865 A1* | 6/2010 | Fudge | H04B 1/1036 |
| | | | 455/296 |
| 2010/0159866 A1* | 6/2010 | Fudge | H04B 1/1036 |
| | | | 455/302 |
| 2010/0295612 A1* | 11/2010 | Ohkawara | H03F 1/3258 |
| | | | 330/149 |
| 2011/0039509 A1* | 2/2011 | Bruchner | H04B 1/40 |
| | | | 455/232.1 |
| 2013/0023226 A1* | 1/2013 | Dai | H04B 1/28 |
| | | | 455/302 |

OTHER PUBLICATIONS

Stephen A. Jantzi et al., "Quadrature Bandpass Modulation for Digital Radio", IEEE Journal of Solid-State Circuits, vol. 32, No. 12, Dec. 1997 1935.

M. Windisch, G. Fettweis, "Blind I/Q Imbalance Parameter Estimation and Compensation in Low-If Receivers", Proceedings of 1st International Symposium on Control,Communications and Signal Processing (ISCCSP '04), Mar. 2004.

Gye-Tae Gil et al., "Non-Data-Aided Approach to I/Q Mismatch Compensation in Low-IF Receivers", Signal Processing, Transaction on, vol. 55, No. 7, pp. 3360-3365, Jul. 2007.

* cited by examiner

WIRELESS COMMUNICATION SYSTEM WITH INTERFERENCE REJECTION MECHANISM AND METHOD OF OPERATION THEREOF

CROSS-REFERENCE TO RELATED APPLICATION(S)

This application claims the benefit of U.S. Provisional Patent Application Ser. No. 61/785,076 filed Mar. 14, 2013, and the subject matter thereof is incorporated herein by reference thereto.

TECHNICAL FIELD

An embodiment of the present invention relates generally to a wireless communication system, and more particularly to a system for interference rejection in the wireless communication system.

BACKGROUND

Modern multiband radios can support hundreds of stations as well as multiple standards. These radios can receive amplitude modulated (AM) radio, frequency modulated (FM), as well as Code Division Multiple Access (CDMA) receivers or Orthogonal Frequency-Division Multiplexing (OFDM) receivers. In order to receive these different frequency bands and standards, the receivers must be capable of identifying the input signal within a field of noise and amplify the input signal without also amplifying the noise. A Radio-Frequency (RF) receiver can include various components to amplify and/or filter an RF signal to recover original data carried by the RF signal. The ability of the RF receiver to pull the signal out of the noise and to separate wanted signal from unwanted signals present can define its range limits.

Multiband radios are a key tool in emergency response situations. Some of these radios are mounted in emergency vehicles including police cars, ambulances, fire trucks, and military vehicles. Others of the multiband radios can be hand-held or miniaturized to fit in a pocket or on a wrist. The reliability and range of these devices are key to the success of personal and commercial communication all over the world.

Many of the techniques used in multiband radio also apply to other forms of wireless communication. Personal communication devices that utilize Global System for Mobile (GSM) Communication, Wideband Code Division Multiple Access (WCDMA), or fourth generation Long-Term Evolution (4G LTE) are all subject to RF interference signals, spectrum spread, and in-phase/quadrature (I/Q) imbalance. These issues can limit the useable range of the personal communication devices and contribute to communication disconnects when switching between transmission sources.

Thus, a need still remains for a wireless communication system with interference rejection mechanism to improve communication ranges and reliability. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a method of operation of a wireless communication system including: down-converting and filtering a composite input from a radio frequency signal; applying an analog correction to the composite input; sampling an analog-corrected signal to form two raw digital stream, one by a primary analog-to-digital converter and one by a secondary analog-to-digital converter of reduced complexity; and reconstructing a facsimile of desired signal from the two digital streams, while also simultaneously monitoring, by a correction control block, the extracted digital signals and adjusting the analog correction by a digital control feedback from the correction control block.

An embodiment of the present invention provides a wireless communication system, including: an antenna configured to receive a received signal; a quadrature mixer, coupled to the antenna, configured to generate a baseband output signal and an interference baseband signal; an adder, coupled to the quadrature mixer, configured to develop a raw digital stream with an analog cancellation; a primary analog-to-digital converter, coupled to the adder, configured to sample an extracted signal from the raw digital stream; and a digital residue adder, coupled to the primary analog-to-digital converter, configured to adjust a digital correction amplifier with a cancellation control.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
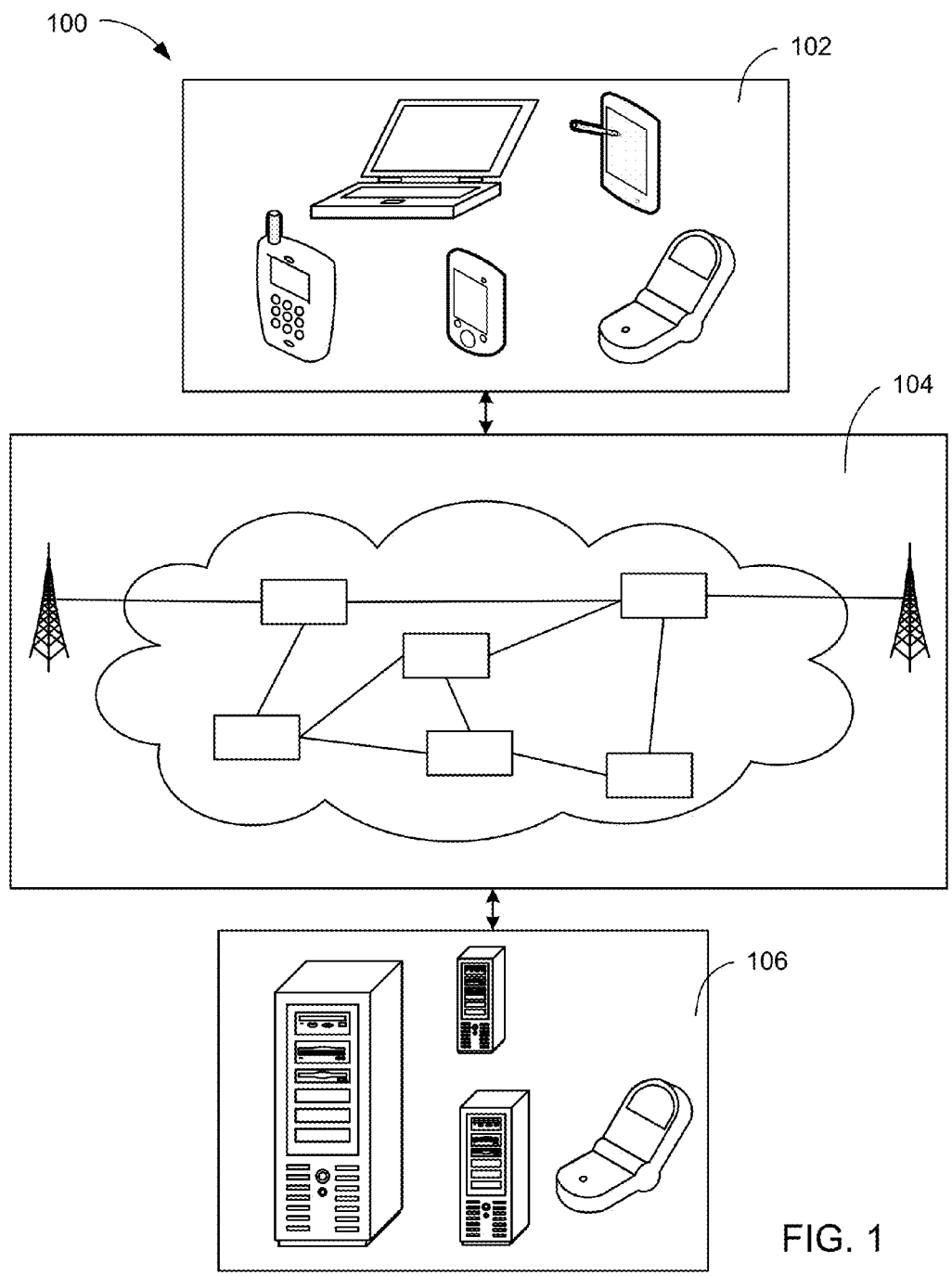
FIG. 1 is a wireless communication system with interference rejection mechanism in an embodiment of the present invention.

The embodiment of the present invention provides a low intermediate frequency (Low-IF) receiver that adjusts a digital control when the absolute value of the digital residue from the digital correction amplifier exceeds 1 least significant bit (LSB) of the signal of interest. Note that setting update threshold at 1 LSB rather than ½ LSB provides hysteresis, to minimize switching of the digital control to activate transistors inside the analog cancellation amplifier. There can also be an upper bound on the value of output of the digital correction amplifier beyond which the digital control to the analog cancellation amplifier are updated even in the middle of receiving a frame of data. This "emergency" update will prevent the auxiliary analog-to-digital converter noise from rising too high in situation where signal strength is rapidly changing causing coupling coefficient α to change.

The embodiment of the present invention provides a complex sigma delta analog-to-digital converter with the combination of the input amplifier, the summing junction, the feedback amplifier, and the loop filter that represents a single stage of the complex sigma delta analog-to-digital converter that can be tuned for signal transfer function and noise transfer function by careful selection of the location of poles and zeroes provided by the loop filter. The complex sigma delta analog-to-digital converter can be formed by multiples of the input amplifier, the summing junction, the feedback amplifier, and the loop filter, in order to provide a reduction in the dynamic range. The complex sigma delta analog-to-digital converter can remove a substantial amount of the adjacent channel power found in the analog corrected input. The reduction in data bandwidth provided by the complex sigma delta analog-to-digital converter can perform an anti-aliasing function which is not provided by prior implementations. The out of band blockers associated with the analog corrected input will be more strongly attenuated, further reducing dynamic range requirements and the word lengths of the digital filters.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

The term "image" referred to herein for example is a source of interference in radio broadcasting, which is created when a generator combines multiple waveforms, and produces a signal with new frequencies. The transmitted signal mirrors the frequency by twice the intermediate or intermediary frequency. As a result, the signal present at the image frequency, also known as the mirror frequency, adjacent channel, back channel, or ghost channel, can produce a component that overlaps the desired signal component and interferes with recovery of desired information. Presence of image signal requires special signal processing components to remove the image signal and limit interference.

The term "module" referred to herein can include software, hardware, or a combination thereof in an embodiment of the present invention in accordance with the context in which the term is used. For example, the software can be machine code, firmware, embedded code, and application software. Also for example, the hardware can be analog circuitry, digital circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a wireless communication system 100 with interference rejection mechanism in an embodiment of the present invention. The wireless communication system 100 includes a first device 102, such as a client or a server, connected to a second device 106, such as a client or server. The first device 102 can communicate with the second device 106 via a communication path 104, such as a wireless or wired network. It is understood that the communication link between the first device 102 and the communication path 104 is a wireless communication link.

For example, the first device 102 can be of any of a variety of wireless communication devices, such as a cellular phone, personal digital assistant, a notebook computer, a liquid crystal display (LCD) system, a light emitting diode (LED) system, or other multi-functional display or entertainment device, or general data communications device. The first device 102 can couple, either directly or indirectly, to the communication path 104 to communicate with the second device 106 or can be a stand-alone device for processing data received through the wireless interface.

For illustrative purposes, the wireless communication system 100 is described with the first device 102 as a client device, although it is understood that the first device 102 can be different types of devices. For example, the first device 102 can also be a server device for presenting user data, research data, navigation data, user communication or the like.

The second device 106 can be any of a variety of centralized or decentralized computing devices, or video audio, or general data storage devices with communication capabilities. For example, the second device 106 can be a multimedia computer, a laptop computer, a desktop computer, a video game console, grid-computing resources, a virtualized computer resource, cloud computing resource, peer-to-peer distributed computing devices, a media playback device, a Digital Video Disk (DVD) player, a three-dimension enabled DVD player, a recording device, such as a camera or video camera, or a combination thereof. In another example, the second device 106 can be a signal receiver for receiving broadcast or live stream signals, such as a television receiver, a cable box, a satellite dish receiver, or a web enabled device. The second device 106 can also be of the same type as the first device 102.

The second device 106 can be centralized in a single room, distributed across different rooms, distributed across different geographical locations, or embedded within a telecommunications network. The second device 106 can couple with the communication path 104 wirelessly or via fixed wired or fiber optic link to communicate with the first device 102.

For illustrative purposes, the wireless communication system 100 is described with the second device 106 as a computing device, although it is understood that the second device 106 can be different types of devices. Also for illustrative purposes, the wireless communication system 100 is shown with the second device 106 and the first device 102 as end points of the communication path 104, although it is understood that the wireless communication system 100 can have a different partition between the first device 102, the second device 106, and the communication path 104. For example, the first device 102, the second device 106, or a combination thereof can also function as part of the communication path 104.

The communication path 104 can span and represent a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
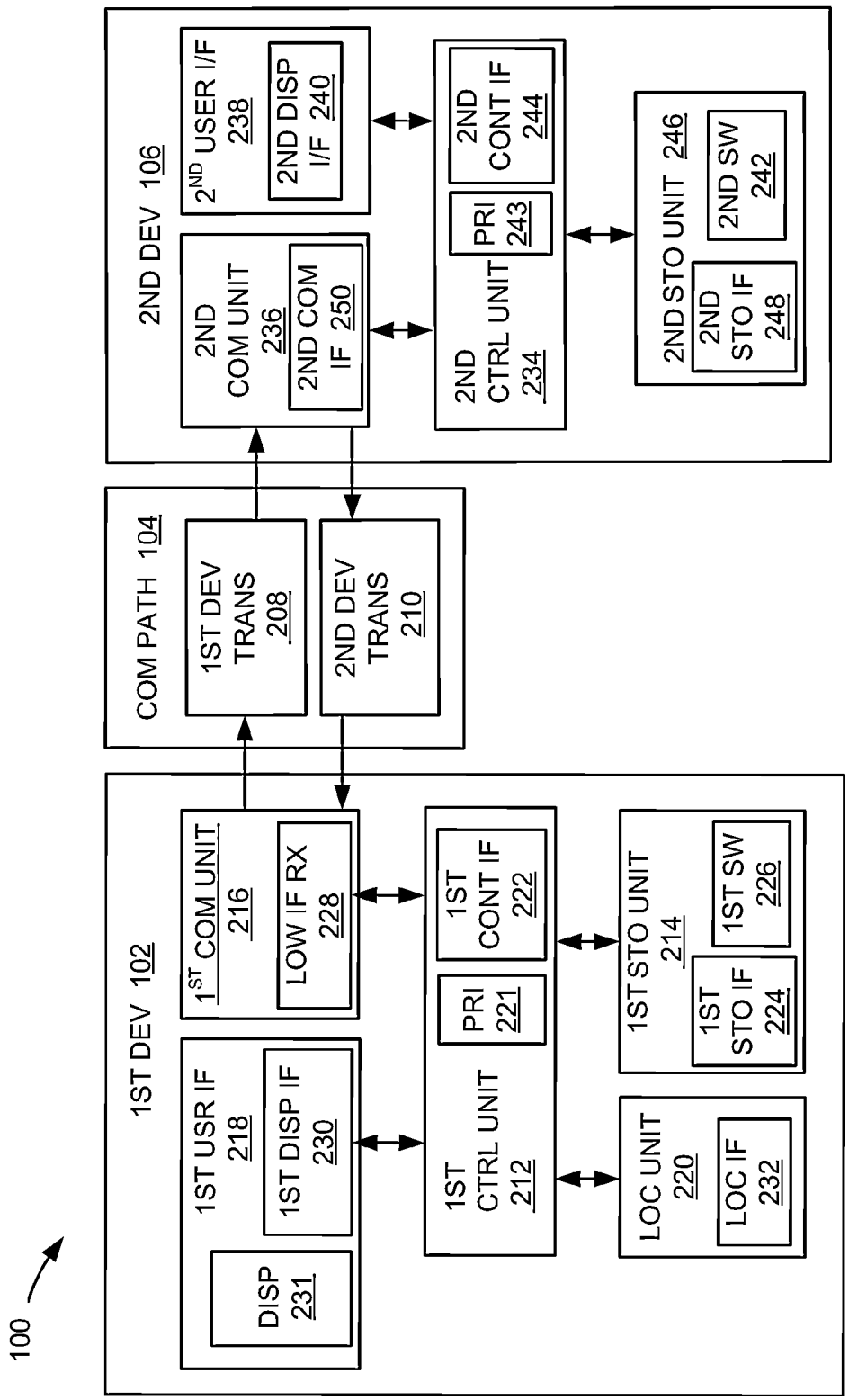
FIG. 2 is an exemplary block diagram of the wireless communication system with interference rejection mechanism in an embodiment of the present invention.

Referring now to FIG. 2, therein is shown an exemplary block diagram of the wireless communication system 100 with direct conversion mechanism in an embodiment of the present invention. The wireless communication system 100 can include the first device 102, the communication path 104, and the second device 106.

The first device 102 can communicate with the second device 106 over the communication path 104. For example, the first device 102, the communication path 104, and the second device 106 can be the first device 102 of FIG. 1, the communication path 104 of FIG. 1, and the second device 106 of FIG. 1, respectively.

The first device 102 can send information in a first device transmission 208 over the communication path 104 to the second device 106. The second device 106 can send information in a second device transmission 210 over the communication path 104 to the first device 102.

For illustrative purposes, the wireless communication system 100 is shown with the first device 102 as a client device, although it is understood that the wireless communication system 100 can have the first device 102 as a different type of device. For example, the first device 102 can be a server.

Also for illustrative purposes, the wireless communication system 100 is shown with the second device 106 as a server, although it is understood that the wireless communication system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of the present invention.

The communication path 104 can be described as a channel which transports the transmitted signal as well as the interference. While the transmitted signal can be modified by the channel due to transmission losses, the interference and noise that is delivered with the transmitted signal can come from an unknown source and is handled as a discrete value independent of the channel.

The first device 102 can include a first control unit 212, a first storage unit 214, a first communication unit 216, a first user interface 218, and a location unit 220. The first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 may also be a stationary device, such as desktop computer, utilities metering device with RF communication capability or similar.

The first control unit 212 can include a first message priority module 221 and a first control interface 222. The first control unit 212 can be implemented in a number of different manners. For example, the first control unit 212 can be a processor, an embedded processor, a microprocessor, hardware control logic, a hardware finite state machine (FSM), a digital signal processor (DSP), or a combination thereof.

The first message priority module 221 can be implemented in different ways and can include hardware gates, software routines, processors, combinational logic, or a combination thereof. The first message priority module 221 can monitor all communication events received through the first communication unit 216. The first communication unit 216 can receive the communication events which include e-mails, text messages, telephone calls, instant messages, voice over Internet protocol (VOIP) messages, or a combination thereof. The first message priority module 221 can generate a statistical priority for each of the communication events, received by the first communication unit 216, for later processing.

The first message priority module 221 can be coupled to the first control interface 222. The first message priority module 221 can access the first storage unit 214 through the first control interface 222 for storing the statistics related to each of the communication events received from the first communication unit 216.

The first control interface 222 can be implemented in different ways and can include different implementations depending on which functional units or external units are being interfaced with the first controller interface 222. For example, the first controller interface 222 can be implemented with a pressure sensor, an inertial sensor, a micro electro-mechanical system (MEMS), optical circuitry, waveguides, wireless circuitry, wireline circuitry, or a combination thereof.

The first storage unit 214 can include a first storage interface 224. The first storage unit 214 can be a volatile memory, a nonvolatile memory, an internal memory, an external memory, or a combination thereof. For example, the first storage unit 214 can be a nonvolatile storage such as non-volatile random access memory (NVRAM), Flash memory, disk storage, or a volatile storage such as static random access memory (SRAM).

The first storage interface 224 can be can be used for communication between the location unit 220 and other functional units in the first device 102. The first storage interface 224 can also be used for communication that is external to the first device 102.

The first storage interface 224 can receive information from the other functional units or from external sources, or can transmit information to the other functional units or to external destinations. The external sources and the external destinations refer to sources and destinations external to the first device 102.

The first storage interface 224 can include different implementations depending on which functional units or external units are being interfaced with the first storage unit 214. The first storage interface 224 can be implemented with technologies and techniques similar to the implementation of the first controller interface 222. A first software 226 can be stored in the first storage unit 214.

The first communication unit 216 can have a first communication interface 228, wherein the first communication interface 228 can be a low-intermediate frequency (IF) multimode receiver. The first communication unit 216 can enable external communication to and from the first device 102. For example, the first communication unit 216 can permit the first device 102 to communicate with the second device 106, an attachment, such as a peripheral device or a computer desktop, and the communication path 104.

The first communication unit 216 can also function as a communication hub allowing the first device 102 to function as part of the communication path 104 and not limited to be an end point or terminal unit to the communication path 104. The first communication unit 216 can include active and passive components, such as microelectronics or an antenna, for interaction with the communication path 104.

The first communication interface 228 can be used for communication between the first communication unit 216 and other functional units in the first device 102. The first communication interface 228 can receive information from the communication path 104. The coupling between the first communication interface 228 and the communication path 104 can be through a wireless radio-frequency (RF) transmission.

The first communication interface 228 can include a low noise amplifier, a mixer, a local oscillator, variable gain amplifier, an I/Q imbalance correction circuit, and one or many digital signal processing blocks and analog or digital controls. The first communication interface 228 can extract a usable signal from the wireless radio-frequency (RF) transmission received from the communication path 104, while rejecting noise and undesirable signals.

The first communication interface 228 can include different implementations depending on which functional units are being interfaced with the first communication unit 216. The first communication interface 228 can be implemented with technologies and techniques that combine analog circuitry and digital circuitry in support of each other.

The first user interface 218 can include a first display interface 230. The first user interface 218 can include an input device and an output device. Examples of the input device of the first user interface 218 can include a keypad, a touchpad, soft-keys, a keyboard, a microphone, or any combination thereof to provide data and communication inputs. Examples of the output device of the first user interface 218 can include the first display interface 230. The first display interface 230 can include a display device 231. Examples of the display device 231 can include a projector, a video screen, a speaker, a touch screen, or any combination thereof.

The location unit 220 can include a location interface 232. The location unit 220 can be implemented in many ways. For example, the location unit 220 can function as at least a part of a global positioning system (GPS), an inertial navigation system, a cellular-tower location system, a pressure location system, an electronic meter reading device, or any combination thereof.

The location interface 232 can be used for communication between the location unit 220 and other functional units in the first device 102. The location interface 232 can also be used for communication that is external to the first device 102.

The location interface 232 can receive information from the other functional units or from external sources, or can transmit information to the other functional units or to external destinations. The external sources and the external destinations refer to sources and destinations external to the first device 102.

The location interface 232 can include different implementations depending on which functional units or external units are being interfaced with the location unit 220. The location interface 232 can be implemented with technologies and techniques similar to the implementation of the first controller interface 222.

The second device 106 can be optimized for implementing the embodiment of the present invention in a multiple device embodiment with the first device 102. The second device 106 can provide the additional or higher performance processing power compared to the first device 102. The second device 106 can include a second control unit 234, a second communication unit 236, and a second user interface 238.

The second user interface 238 allows a user (not shown) to interface and interact with the second device 206. The second user interface 238 can include an input device and an output device. Examples of the input device of the second user interface 238 can include a keypad, a touchpad, soft-keys, a keyboard, a microphone, or any combination thereof to provide data and communication inputs. Examples of the output device of the second user interface 238 can include a second display interface 240. The second display interface 240 can include a display, a projector, a video screen, a speaker, or any combination thereof.

The second control unit 234 can execute a second software 242 to provide the intelligence of the second device 106 of the communication system 200. The second software 242 can operate in conjunction with the first software 226. The second control unit 234 can provide additional performance compared to the first control unit 212.

The second control unit 234 can operate the second user interface 238 to display information. The second control unit 234 can also execute the second software 242 for the other functions of the communication system 100, including operating the second communication unit 236 to communicate with the first device 102 over the communication path 104.

The second control unit 234 can be implemented in a number of different manners. For example, the second control unit 234 can be a processor, an embedded processor, a microprocessor, hardware control logic, a hardware finite state machine (FSM), a digital signal processor (DSP), or a combination thereof.

The second control unit 234 can include a second message priority module 243 and a second controller interface 244. The second controller interface 244 can be used for communication between the second control unit 234 and other functional units in the second device 106. The second controller interface 244 can also be used for communication that is external to the second device 106.

The second message priority module 243 can be implemented in different ways and can include hardware gates, software routines, processors, combinational logic, or a combination thereof. The second message priority module 243 can assist the first message priority module 221 in calculating the priority of the communication events sent to the first device 102.

The second message priority module 243 can calculate a message priority in support of the first message priority module 221. The second message priority module 243 can combine any of the communication events sent by a single user in order to calculate the overall priority of the communication event.

The second controller interface 244 can receive information from the other functional units or from external sources, or can transmit information to the other functional units or to external destinations. The external sources and the external destinations refer to sources and destinations external to the second device 106.

The second controller interface 244 can be implemented in different ways and can include different implementations depending on which functional units or external units are being interfaced with the second controller interface 244. For example, the second controller interface 244 can be implemented with a pressure sensor, an inertial sensor, a micro electro-mechanical system (MEMS), optical circuitry, waveguides, wireless circuitry, wireline circuitry, or a combination thereof.

A second storage unit 246 can store the second software 242. The second storage unit 246 can also store the relevant information, such as contact lists, caller identifications, established groups, recorded messages, response options, priority of the communication events, or any combination thereof. The second storage unit 246 can be sized to provide the additional storage capacity to supplement the first storage unit 214.

For illustrative purposes, the second storage unit 246 is shown as a single element, although it is understood that the second storage unit 246 can be a distribution of storage elements. Also for illustrative purposes, the wireless communication system 100 is shown with the second storage unit 246 as a single hierarchy storage system, although it is understood that the navigation system 100 can have the second storage unit 246 in a different configuration. For example, the second storage unit 246 can be formed with different storage technologies forming a memory hierarchal system including different levels of caching, main memory, rotating media, or off-line storage.

The second storage unit 246 can be a volatile memory, a nonvolatile memory, an internal memory, an external memory, or a combination thereof. For example, the second storage unit 246 can be a nonvolatile storage such as non-volatile random access memory (NVRAM), Flash memory, disk storage, or a volatile storage such as static random access memory (SRAM).

The second storage unit 246 can include a second storage interface 248. The second storage interface 248 can be used for communication between the second control unit 234 and other functional units in the second device 106. The second storage interface 248 can also be used for communication that is external to the second device 106.

The second storage interface 248 can receive information from the other functional units or from external sources, or can transmit information to the other functional units or to external destinations. The external sources and the external destinations refer to sources and destinations external to the second device 106.

The second storage interface 248 can include different implementations depending on which functional units or external units are being interfaced with the second storage unit 246. The second storage interface 248 can be implemented with technologies and techniques similar to the implementation of the second controller interface 244.

The second communication unit 236 can enable external communication to and from the second device 206. For example, the second communication unit 236 can permit the second device 106 to communicate with the first device 102 over the communication path 104.

The second communication unit 236 can also function as a communication hub allowing the second device 106 to function as part of the communication path 104 and not limited to be an end point or terminal unit to the communication path 104. The second communication unit 236 can include active and passive components, such as microelectronics or an antenna, for interaction with the communication path 104. The second communication unit 236 can receive the communication events which include e-mails, text messages, telephone calls, instant messages, voice over Internet protocol (VOIP), or a combination thereof on behalf of the first device 102 when the first device 102 is unavailable.

The second communication unit 236 can include a second communication interface 250. The second communication interface 250 can be used for communication between the second communication unit 236 and other functional units in the second device 106. The second communication interface 250 can receive information from the other functional units or can transmit information to the other functional units.

The second communication interface 250 can include different implementations depending on which functional units are being interfaced with the second communication unit 236. The second communication interface 250 can be implemented with technologies and techniques similar to the implementation of the second controller interface 244.

The first communication unit 216 can couple with the communication path 104 to send information to the second device 106 in the first device transmission 208. The second device 106 can receive information in the second communication unit 236 from the first device transmission 208 of the communication path 104.

The second communication unit 236 can couple with the communication path 104 to send information to the first device 102 in the second device transmission 210. The first device 102 can receive information in the first communication unit 216 from the second device transmission 210 of the communication path 104. The communication system 200 can be executed by the first control unit 212, the second control unit 234, or a combination thereof.

For illustrative purposes, the second device 106 is shown with the partition having the second user interface 238, the second storage unit 246, the second control unit 234, and the second communication unit 236, although it is understood that the second device 106 can have a different partition. For example, the second software 242 can be partitioned differently such that some or all of its function can be in the second control unit 234 and the second communication unit 236. In addition, the second device 106 can include other functional units not shown in FIG. 2 for clarity.

After downloading information from the communication path 104, the functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104 for sorting data, buffering information, preparing updates, displaying status, or the like. These functions can be executed solely by the second device 106 in preparation for further communication through the communication path 104.

For illustrative purposes, the wireless communication system 100 is described by operation of the first device 102 and the second device 106. It is understood that the first device 102 and the second device 106 can operate any of the modules and functions of the wireless communication system 100. For example, the first device 102 is described to operate the location unit 220, although it is understood that the second device 106 can also operate the location unit 220.

Figure 3:
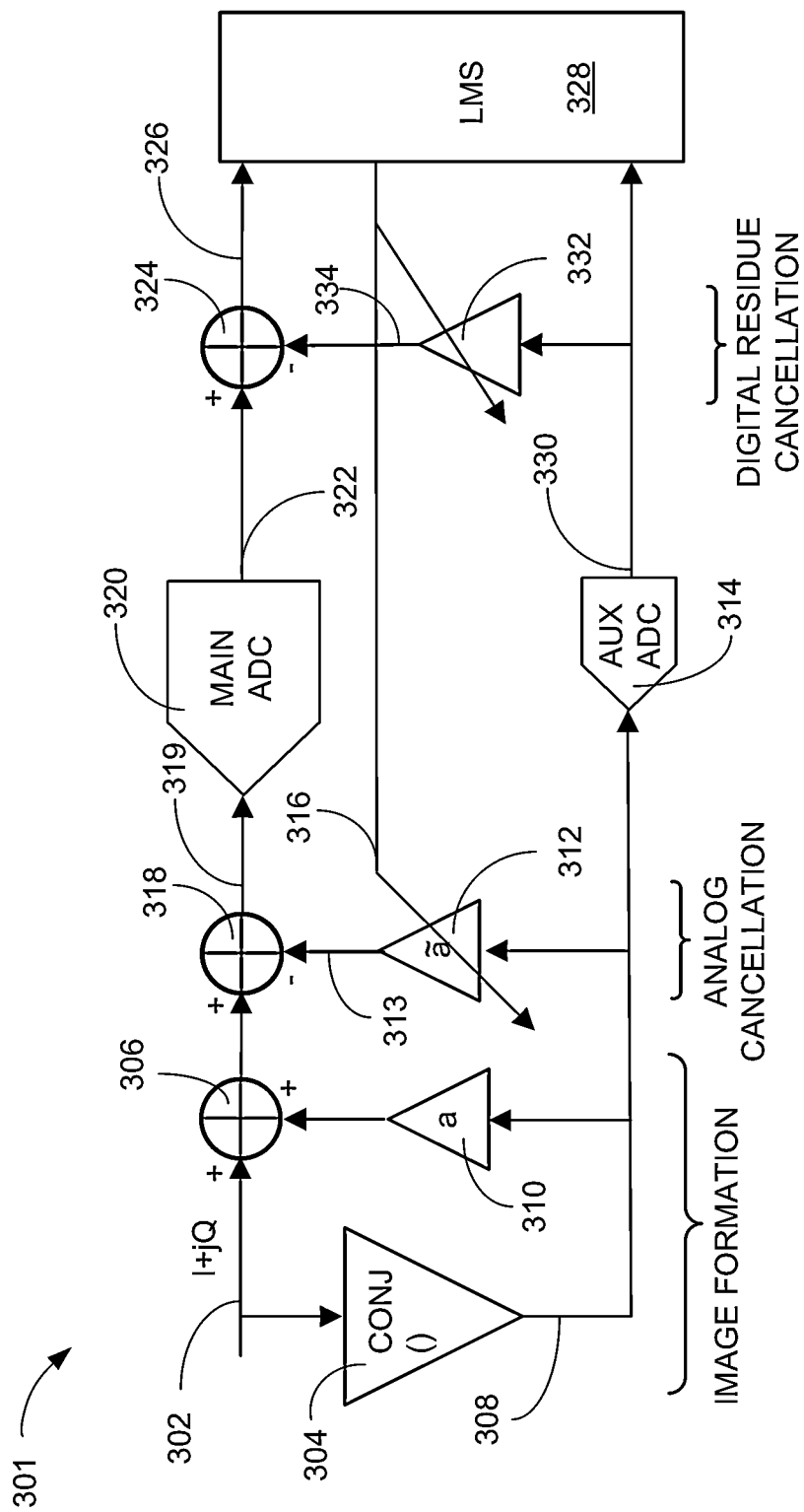
FIG. 3 is an exemplary functional block diagram of baseband operations of a low-intermediate frequency receiver of the wireless communication system.

Referring now to FIG. 3, therein is shown an exemplary functional block diagram of baseband operations of a low-intermediate frequency receiver 301 of the wireless communication system 100. The exemplary block diagram of the low-intermediate frequency receiver 301 depicts a composite input (I+jQ) 302, which can be a combination of in-phase and quadrature components of a received signal. The composite input (I+jQ) 302 is an ideal representation of a signal in the wireless communication system 100 of FIG. 1. The "Image Formation" block illustrates signal flow view of formation of image in the communication path. A conjugate amplifier 304 and an analog cancellation adder 306 are mathematical representations of receiver imperfections (principally amplitude and phase mismatch of the mixer). An ideal communication path would correspond to having a=0 in an image formation amplifier 310. In that idealized case, the signal at the output of 306 would be identical to the composite input I+jQ 302 and analog cancellation, including an analog cancellation amplifier 312 and an adder 318, as well as AUX ADC path including a digital correction signal 330, a digital correction amplifier 332, and a correction control block 328, would be unnecessary. Unfortunately, the idealized case is not possible in our electronically noisy world.

An interference image 308 can also be processed by the analog cancellation amplifier 312 and an auxiliary analog-to-digital converter 314. The analog cancellation amplifier 312 can be implemented as an analog circuit with a scaling capability provided through a digital control 316 for processing of an analog cancellation 313 by the adder 318. It is understood that the digital control 316 can be implemented as a bus of control lines for activating multiple sources (not shown) for communicating with the analog cancellation amplifier 312.

The analog signals I and Q are combined into complex signals I+jQ at analog node 319 and I−jQ at the analog node 426. The devices 318 and 306 represent forming of pair of signals out of two individual analog signals.

The primary analog-to-digital converter 320 can perform a digital sampling of the raw analog stream 319 in order to develop a pair of digital signals 322. The primary analog-to-digital converter 320 can incorporate a complex bandpass filter (CBPF) having a signal transfer function at a frequency to pass the desired frequency component of the composite signal 319 and a noise transfer function to block the residual portion of the composite input 319. After additional digital signal processing, digital signal 322 will consist primarily of frequency components resident at the band of interest. Similarly digital signal at 330 will consist primarily of signal components resident at the image frequency.

The extracted signal 322 can be coupled to a residue cancellation adder 324 which can correct the extracted signal 322 to form a signal of interest (SOI) 326 at the output of the residue cancellation adder 324. The signal of interest 326 and the signal 330 will be processed by a correlator 428 on sample-by-sample basis to determine instantaneous correlation value 429. The instantaneous correlation values 429 will be processed by an averaging filter 430 to determine average correction coefficient 432. The average correlation coefficient 432 will control the strength of the digital amplifier 332 to adjust the strength of image cancellation signal 334. The signal of interest 326 can be a representation of the message sent through the communication path 104 of FIG. 1 and can be displayed on the display device 231 of FIG. 2 of the first device 102 of FIG. 1.

The auxiliary analog-to-digital converter 314 can be implemented as a complex bandpass filter or the primary analog-to-digital converter 320 but having significantly less complexity. The auxiliary analog-to-digital converter 314 can provide the digital correction signal 330 that is coupled to the digital correction amplifier 332 and the correction control block 328. The output of the digital correction amplifier 332 can be a digital residue 334 coupled to a negative input of the residue cancellation adder 324. The digital correction amplifier 332 can be controlled by the digital control 316 in order to manage the amount of correction provided as the digital residue 334 from the digital correction amplifier 332 to the residue cancellation adder 324.

The auxiliary analog-to-digital converter 314 can remain powered off until an adjustment cycle is required as determined by the correction control block 328. When sufficient data integrity of the signal of interest 326 is provided by analog correction through the adder 318, the correction control block 328 can power off the auxiliary analog-to-digital converter 314 and the digital correction amplifier 332 in order to save system power without losing any data reliability.

The correction control block 328 can source the digital control 316 in order to manage the analog cancellation amplifier 312, the digital correction amplifier 332, and the auxiliary analog-to-digital converter 314. The correction control block 328 can implement a least mean squared (LMS) algorithm for analyzing the signal correction capability of the low-intermediate frequency receiver 301. The correction control block 328 can update the digital control 316 when the low-intermediate frequency receiver 301 is idle, such as between global system for mobile communications (GSM) packets, orthogonal frequency division multiplexing (OFDM) frames, or the like.

It has been discovered that when the absolute value of the digital residue 334 from the digital correction amplifier 332 exceeds 1 least significant bit (LSB) of the signal of interest 326, the digital control 316 is updated. Note that setting update threshold at 1 LSB rather than ½ LSB provides hysteresis, to minimize switching of the digital control 316 to activate transistors inside the analog cancellation amplifier 312. There can also be an upper bound on the value of output of the digital correction amplifier 332 beyond which the digital control 316 to the analog cancellation amplifier 312 are updated even in the middle of receiving a frame of data. This "emergency" update will prevent the auxiliary analog-to-digital converter 314 noise from rising too high in situation where signal strength is rapidly changing causing coupling coefficient α to change.

By way of an example, the signal of interest 326 can be 60 dB lower than the interference image 308. The image rejection ratio (IRR) of the primary analog-to-digital converter 320 is assumed to be 30 dB, resulting in the interference image 308 that is still another 30 dB above the signal of interest 326. After Analog cancellation and Digital residue cancellation, the signal of interest 326 is recovered. The signal of interest 326 was deliberately spectrally shaped as a linear power vs. frequency relationship, since this allows the visual determination of remnant of the interference image 308. Here, the signal of interest 326 remains linear all the way to the lowest power point (lowest SOI frequency). This indicates that the actual strength of the interference image 308 is at least another 10 dB below the level of the signal of interest 326. This example provides that the total achievable IRR of low-intermediate frequency receiver 301 is at least 73 dB.

Figure 4:
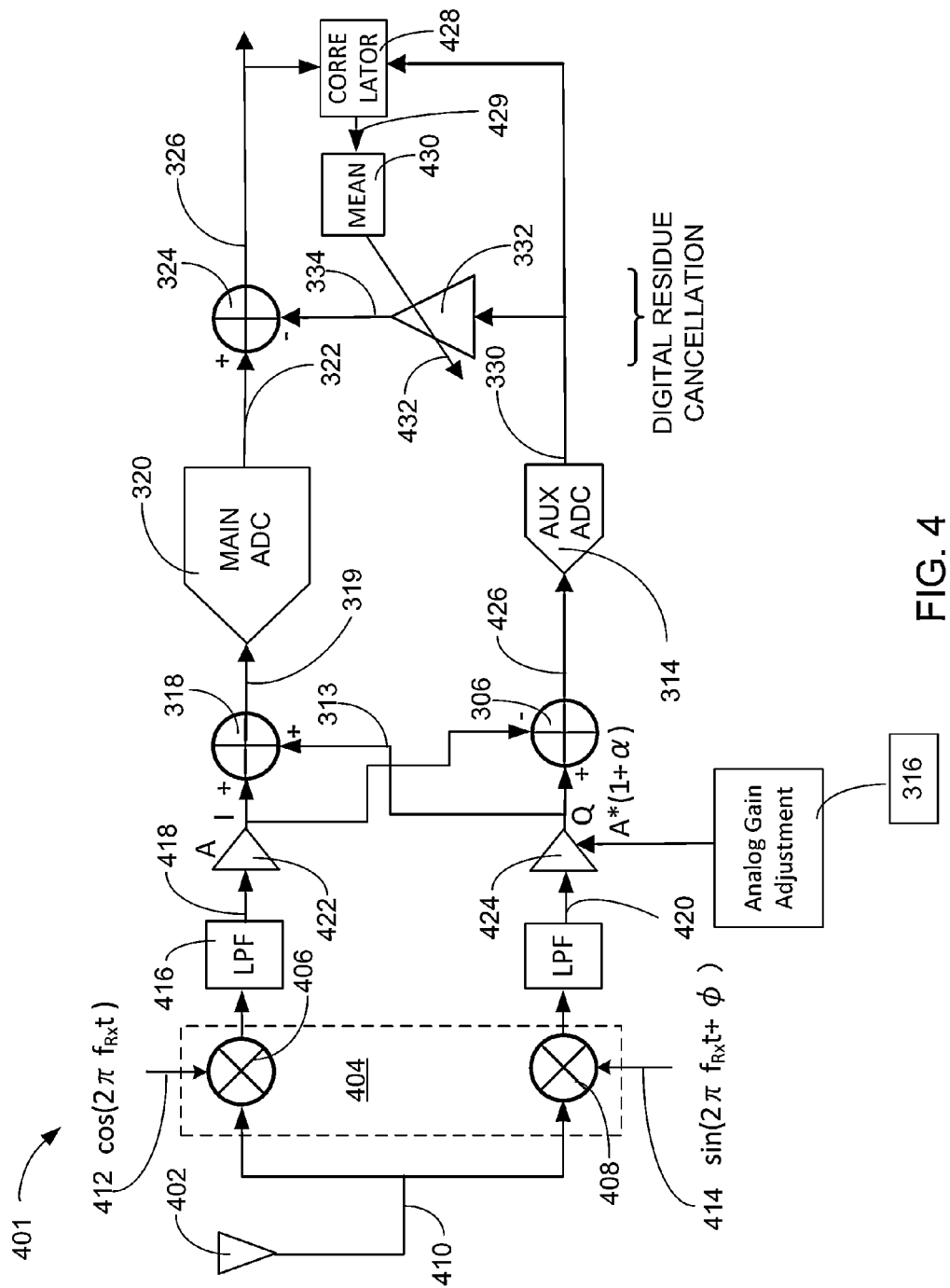
FIG. 4 is shown an exemplary hardware block diagram of a low-intermediate frequency receiver of the wireless communication system.

Referring now to FIG. 4, therein is shown an exemplary hardware block diagram of a low-intermediate frequency receiver 401 of the wireless communication system 100. The exemplary hardware block diagram of the low-intermediate frequency receiver 401 depicts a receiver antenna 402 coupled to a quadrature mixer 404 having an inphase mixer 406 and a quadrature adder 408 for processing a received signal 410.

The inphase mixer 406 also receives an inphase reference signal 412, which can reflect the frequency of the received signal 410, minus chosen intermediate frequency (IF). The inphase reference signal 412 can be sourced from a local oscillator (not shown) that is adjusted to desired frequency of the received signal 410, minus chosen intermediate frequency (IF).

The quadrature adder 408 also receives a quadrature reference signal 414, which can reflect the frequency of the received signal 410, minus chosen intermediate frequency (IF), but has been phase shifted by 90 degrees. The quadrature reference signal 414 can be sourced from the local oscillator (not shown) that is adjusted to desired frequency of the received signal 410, minus chosen intermediate frequency (IF), and passed through a 90 degree phase shifter (not shown).

A low pass filter 416 can be used on the inphase signal, for forming the baseband output signal I 418, and the quadrature signal Q 420. An amplifier 422 can scale the desired I component signal in preparation of digital signal processing. The quadrature path can use a scaling amplifier 424 in order to properly match the baseband signal Q 420 to the baseband output signal 418. Image signal will be minimized when gains of I and Q signals are identical. The analog gain adjustment block 316 provides fine adjustment of gain difference between I and Q signals.

It has been discovered that the wireless communication system 100 of FIG. 1 can provide a mixed-mode interference rejection, such as a hybrid of analog and digital interference rejection. The analog gain adjust block 316 can be employed to provide medium-resolution interference rejection. The residue cancellation adder 324 can provide residual, high-resolution interference rejection. Another discovery is that large portion of digital interference rejection circuitry will be used by both the analog and the digital portions. Further, the digital residue cancellation circuit can reduce the complexity of the analog interference cancellation circuitry, while analog correction reduces complexity of that the primary analog-to-digital converter 320 and a reduced bit-width of digital components on the auxiliary analog-to-digital converter 314.

Figure 5A:
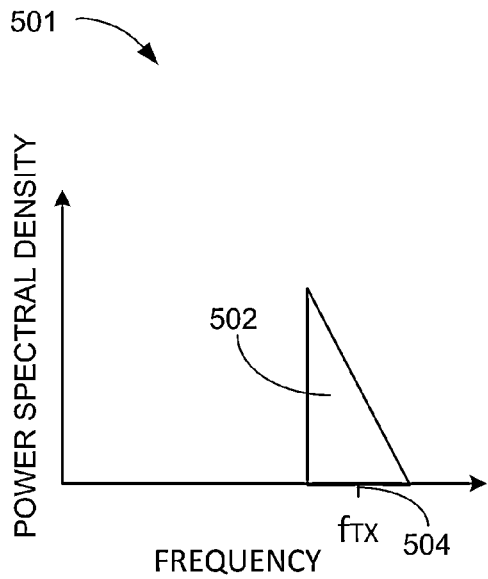
FIGS. 5A, 5B, 5C, and 5D, is graphs of the spectral density of the signal of interest and an adjacent interference channel

Referring now to FIGS. 5A, 5B, 5C, and 5D, therein is shown graphs of the spectral density 501 of the signal of interest 326 and an adjacent interference channel. FIG. 5A depicts a spectrum as transmitted from a transmit antenna in the communication path 104 of FIG. 1. A signal of interest 502 can be positioned at the transmit frequency 504. It is understood that the actual shape of the spectrum of the signal of interest 502 is different and the triangular shape used to designate the signal of interest 502 is an example used to differentiate from other spectral elements.

Figure 5B:
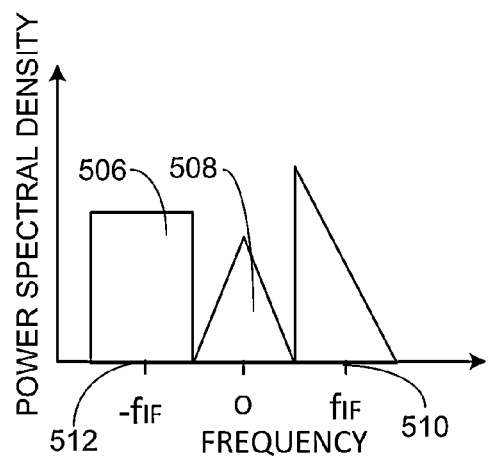

FIG. 5B depicts the spectrum as received at the antenna 402 of FIG. 4, after downconversion to near DC. The signal of interest 502 has been joined by an image channel 506 and a noise or other signals 508. The image channel 506 can be positioned at an IF frequency 510. The noise or other signals 508 can be centered about a zero frequency. The image channel 506 can be positioned at a minus IF 512. It is understood that the position of the image channel 506 is idealized in order to show the spectrum components present at the antenna 402.

Figure 5C:
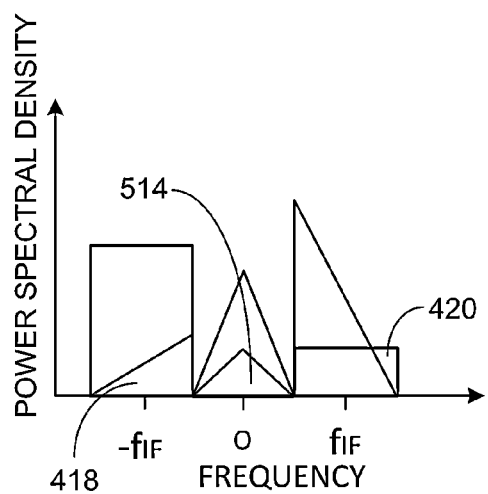

FIG. 5C depicts the spectrum as actually processed by the quadrature mixer 404 of FIG. 4. The interference baseband signal 420 can overlay the signal of interest 502. The baseband output signal 418 can overlay the image channel 506. The noise distribution 508 can be suppressed to a residual noise distribution 514 that will be processed by the primary analog-to-digital converter 320 of FIG. 3 and the auxiliary analog-to-digital converter 314 of FIG. 3.

Figure 5D:
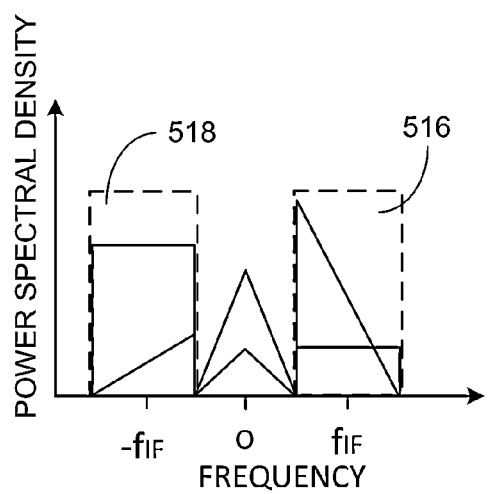

FIG. 5D depicts a channel of interest 516 that identifies the frequencies and power spectral density that is processed by the primary analog-to-digital converter 320. An interference channel 518 that can be processed by the auxiliary analog-to-digital converter 314.

Figure 6:
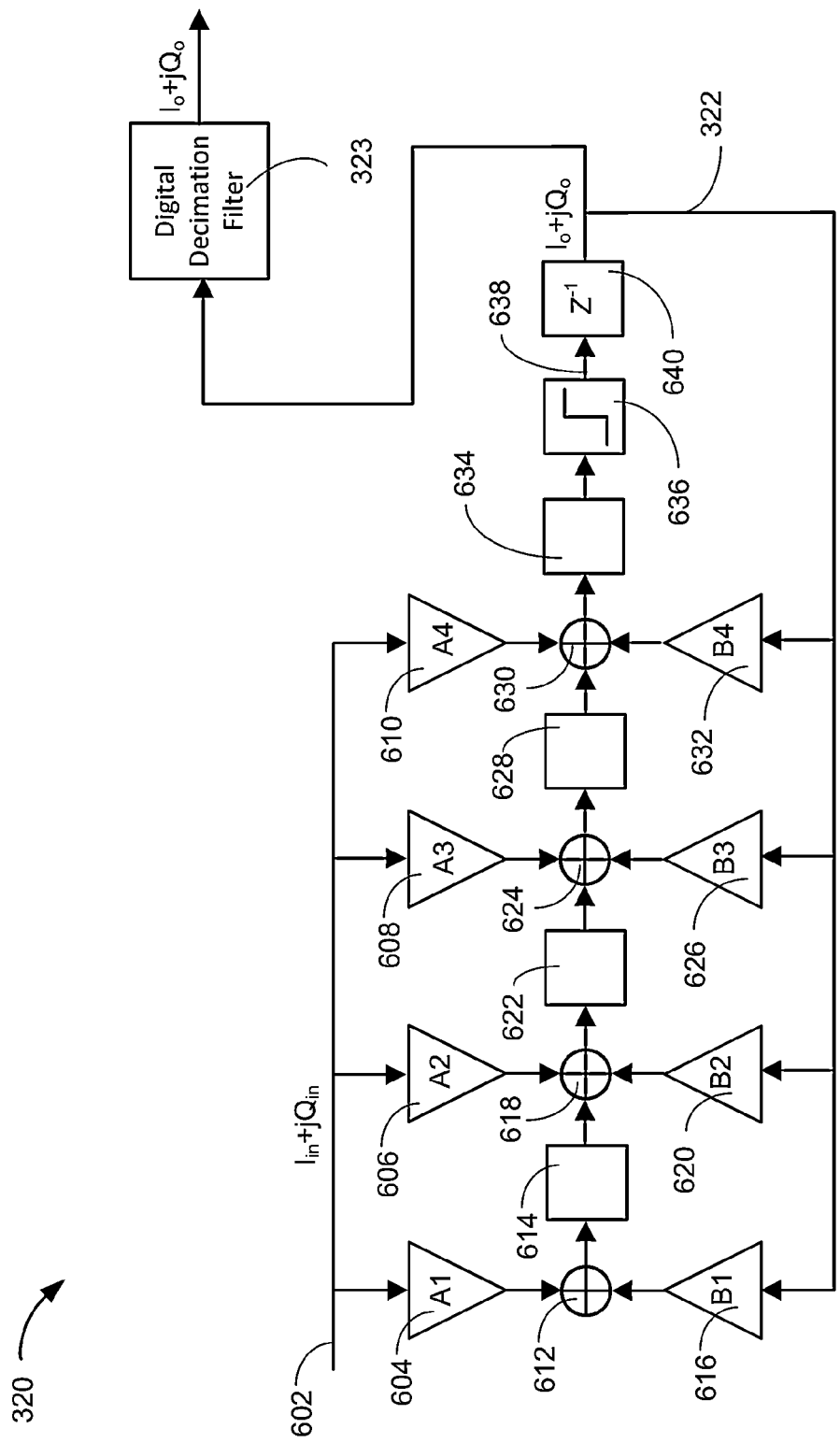
FIG. 6 is an exemplary block diagram of the primary analog-to-digital converter.

Referring now to FIG. 6, therein is shown an exemplary block diagram of the primary analog-to-digital converter 320. The primary analog-to-digital converter 320 can be a complex sigma delta analog-to-digital converter.

The block diagram of the primary analog-to-digital converter 320 depicts an analog corrected input 602, such as the output of the adder 318 of FIG. 3 coupled to each of a first input amplifier 604, a second input amplifier 606, a third input amplifier 608, and a fourth input amplifier 610. The output of the first input amplifier 604 can be coupled to a first summing junction 612. The output of the first summing junction 612 can be coupled to a first loop filter 614. The first summing junction 612 also receives input from a first feedback amplifier 616.

The output of the first integrator 614 can be coupled to a second summing junction 618. The second summing junction 618 can also receive inputs from the second input amplifier 606 and a second feedback amplifier 620. The output of the second summing junction 618 can be coupled to the input of a second integrator 622.

The output of the second loop filter 622 can be coupled to a third summing junction 624. The third summing junction 624 can also receive inputs from the third input amplifier 608 and a third feedback amplifier 626. The output of the third summing junction 624 can be coupled to the input of a third integrator 628.

The output of the third loop filter 624 can be coupled to a fourth summing junction 630. The fourth summing junction 630 can also receive inputs from the fourth input amplifier 610 and a fourth feedback amplifier 632. The output of the fourth summing junction 630 can be coupled to the input of a fourth integrator 634. The output of the fourth loop filter 634 can be coupled to a quantizer 636.

The quantizer 636 can receive a clock (not shown) that operates at some multiple (typically eight times or higher) of the bandwidth of the analog input 602. The increased frequency of the clocking of the quantizer 636 improves the resolution of a digital data 638 that can be extracted from the analog corrected input 602. The digital data is further processed by the decimation filter 323 that serves to eliminate spectrally shaped quantization noise and reduce sampling rate down to the Nyquist rate of twice the signal bandwidth.

The digital data 638 can be input to a digital storage block 640 that is coupled to the quantizer 636. The output of the digital storage block 640 represents the extracted signal 322 of FIG. 3. The output of the delay block 640 also drives the digital-to-analog conversion inputs of blocks 616, 620, 626 and 632.

It has been discovered that the combination of the input amplifier 604, the summing junction 612, the feedback amplifier 616, and the integrator 614 represents a single stage of the primary analog-to-digital converter 320 that can be tuned for signal transfer function and noise transfer function by careful selection of the location of poles and zeroes provided by the loop filter 614.

The primary analog-to-digital converter 320 can remove a substantial amount of the adjacent channel power found in the analog corrected input 602. The application of complex analog to digital converters provides dual benefits. First benefit is reduction in data bandwidth provided by the primary analog-to-digital converter 320. The second benefit is the ability of the primary analog-to-digital converter 320 to provide an anti-aliasing function which is not provided by the conventional ADC implementations. The signals at frequencies located adjacent to the band of interest in the signal input 602 will be more strongly attenuated, further reducing dynamic range requirements of the primary analog-to-digital converter 320, and the word lengths of the digital filters that follow.

Figure 7:
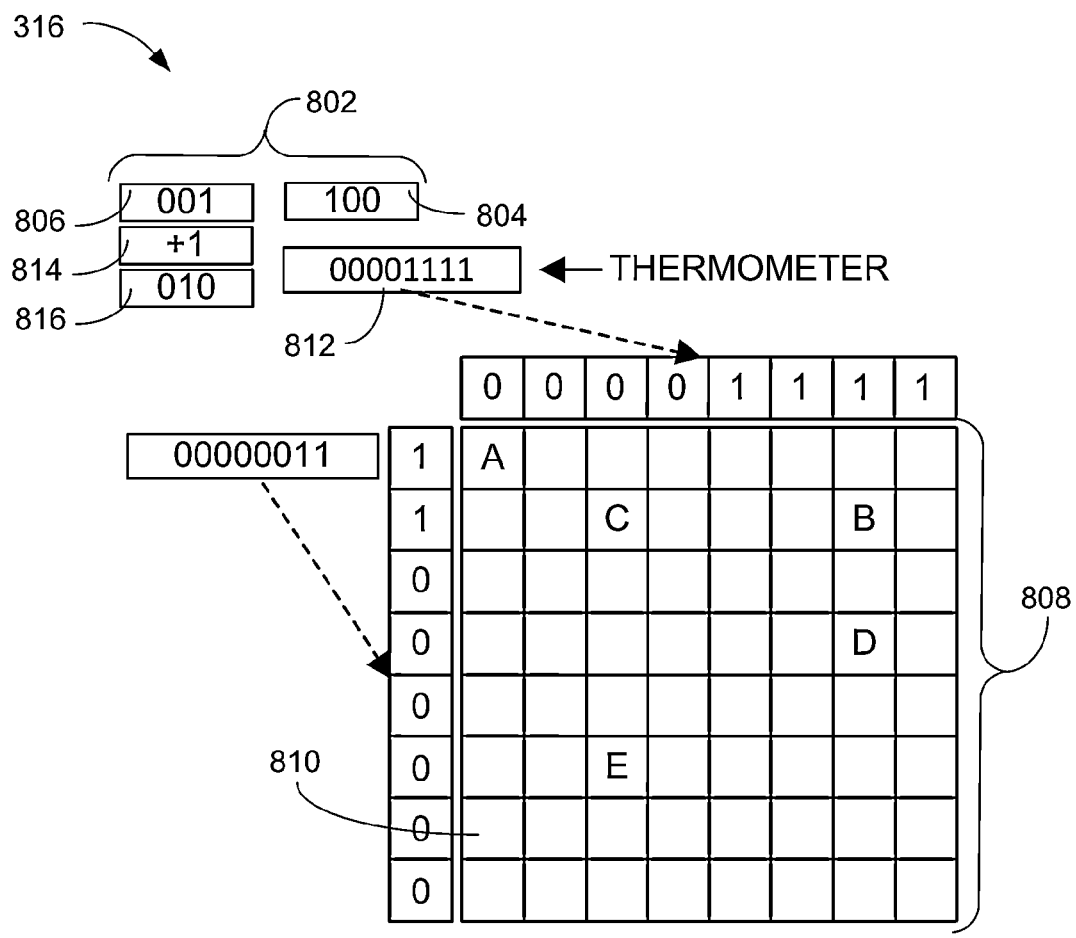
FIG. 7 is a functional representation of the digital control of the low-intermediate frequency receiver of FIG. 3.

Referring now to FIG. 7, therein is shown a functional representation of the digital control 316 of the analog adjustment block 316 of low-intermediate frequency receiver 301 of FIG. 3. The functional representation of the digital control 316 includes generating a control code 802 having a column code 804 and a row code 806. The correction control block 328 of FIG. 3 can control an array 808 of an activation switch 810 by utilizing a thermometer code, which provides eight control lines from the three bits of the column code 804 and eight lines from the row code 806.

Thermometer coding is a form of unary coding with each bit having equal weight. All ones are collected in the LSB positions, while zeros are collected in MSB positions of the output. The output of thermometer coding is well suited for control of an array of identical elements such as the activation switches 810. The resulting control is guaranteed to be monotonic and does not suffer from major code transition problem of binary-weighted controls. As the number of elements grows, it becomes impractical to individually control elements by generating, 256 or 1024 control lines. Instead, elements are typically arranged in a square array, with row/column control signals and final local decoding in each cell using row/column signals.

The three bits of the column code 804 can be translated through a table look-up. The example shown has the column code 804 of "100", which translates to a column thermometer code 812 of "00001111". For the row code 806 an offset value 814 can be applied to generate a row code entry 816. The example shown has an offset value 814 of "+1" that is added to the row code 806 having a value of "001" to yield the row code entry 816 of "010". The row code entry 816 can be subjected to the same table look-up and can yield a row thermometer code 818 having a value of "00000011".

The intersection of the bits of the column thermometer code 812 and the bits of the row thermometer code 818 can select the activation switch 810 at any particular location in the array 808, either individually or in groups. Since the selection of a single instance of the activation switch 810 is intended to adjust the analog cancellation amplifier 312 of FIG. 3 or the digital correction amplifier 332 of FIG. 3, the complete control of the analog cancellation and the digital residue cancellation is possible.

It is understood that the above example was for simplification of understanding without limiting the embodiment of the present invention. It is further understood that the selection of an instance of the activation switch 810 can be interpreted as activating a toggle that can remain active until the activation switch 810 is turned off and once again turned on to negate the toggle. In other implementations the activation switch 810 can be a direct enable that will only remain active as long as the activation switch 810 is asserted.

Figure 8:
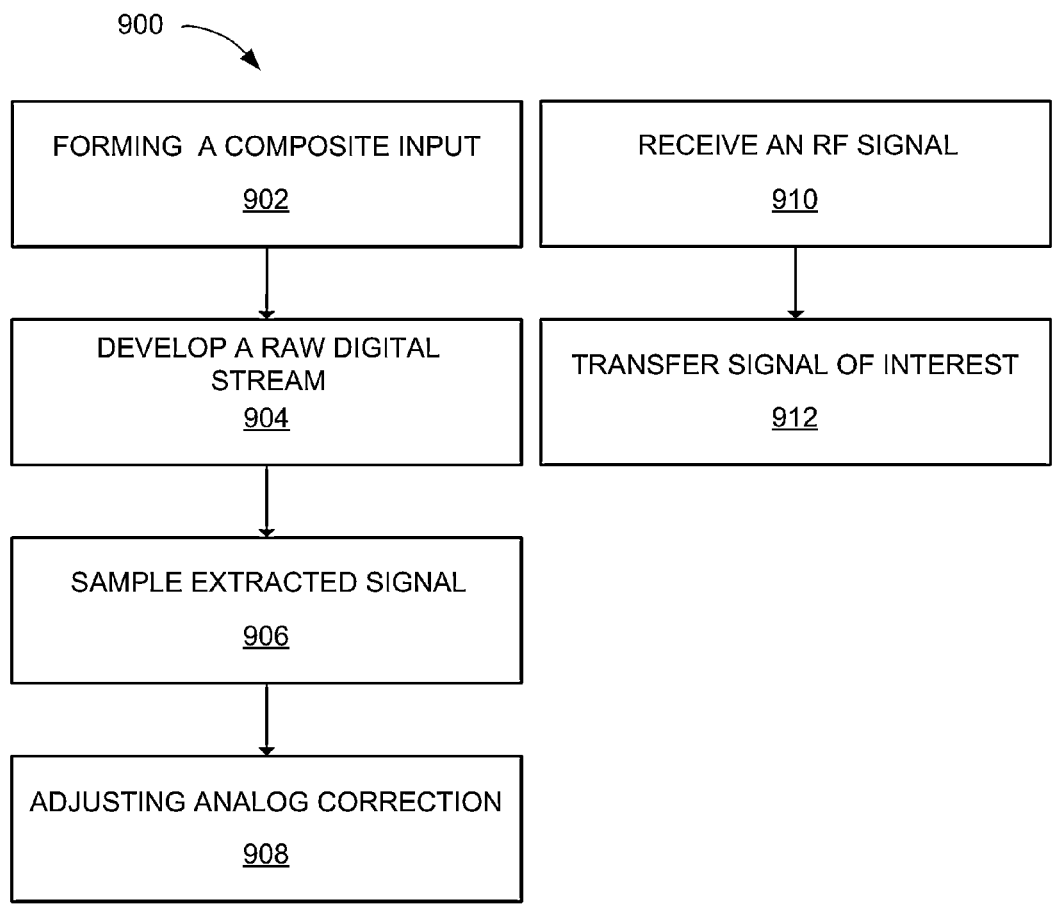
FIG. 8 is a flow chart of a method of operation of a wireless communication system in an embodiment of the present invention.

Referring now to FIG. 8, therein is shown a flow chart of a method 900 of operation of a wireless communication system 100 in an embodiment of the present invention. The method 900 includes: filtering a composite input from a radio frequency signal in a block 902; developing a raw digital stream by applying an analog correction to the composite input in a block 904; sampling an extracted signal, from the raw digital stream, by a primary analog-to-digital converter in a block 906; and monitoring, by a correction control block, the extracted signal including adjusting the analog correction by a digital control from the correction control block in a block 908.

The wireless communication system can process the received radio frequency signal by removing the interference image by the application of the analog cancellation. The resulting raw digital stream can be sampled through the primary analog-to-digital converter in order to produce the extracted signal. The correction control block can administer the analog cancellation as well as removing a digital residue to enhance the processing of the signal of interest from the extracted signal. The correction control block can monitor the signal of interest in order to adjust the analog correction and the digital correction amplifier by generating and controlling the digital control.

The method 900 includes: receiving a radio frequency signal by a low-intermediate frequency receiver including: filtering a composite input from the radio frequency signal in a block 902; developing a raw digital stream by applying an analog correction to the composite input in a block 904; sampling an extracted signal, from the raw digital stream, by a primary analog-to-digital converter in a block 906; and monitoring, by a correction control block, the extracted signal including adjusting the analog correction by a digital control from the correction control block in a block 908; receiving a radio frequency signal by a low-intermediate frequency receiver including: filtering a composite input from the radio frequency signal, developing a raw digital stream by applying an analog correction to the composite input, sampling an extracted signal, from the raw digital stream, by a primary analog-to-digital converter, and monitoring, by a correction control block, the extracted signal including adjusting the analog correction by a digital control from the correction control block in a block 910; and transferring a signal of interest from the low-intermediate frequency receiver to a first control unit wherein the first control unit prepares the signal of interest for displaying on a display device in a block 912.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operation of a wireless communication system comprising:
   filtering a composite input from a radio frequency signal;
   developing a raw stream based on applying an analog correction to the composite input including removing an interference image from the composite input by an analog cancellation amplifier;
   developing an extracted signal based on sampling the raw stream with a primary analog-to-digital converter;
   generating a digital control based on monitoring the extracted signal with a correction control block; and
   adjusting the analog correction and a digital residue, at the output of the primary analog-to-digital converter, based on the digital control generated using the extracted signal and fed back from the correction control block.

2. The method as claimed in claim 1 further comprising forming a digital correction signal, by an auxiliary analog-to-digital converter, monitored by the correction control block for determining the digital control.

3. The method as claimed in claim 1 further comprising generating an interference image from the composite input including correcting the raw stream.

4. The method as claimed in claim 1 further comprising modifying, through a residue cancellation adder, the extracted signal by activating a digital correction amplifier.

5. The method as claimed in claim 1 further comprising adjusting, with an image formation amplifier, the composite input through an analog cancellation adder.

6. A method of operation of a wireless communication system comprising:
   receiving a radio frequency signal by a low-intermediate frequency receiver including:
      filtering a composite input from the radio frequency signal,
      developing a raw stream based on applying an analog correction to the composite input including removing an interference image from the composite input by an analog cancellation amplifier,
      developing an extracted signal based on sampling the raw stream with a primary analog-to-digital converter,
      generating a digital control based on monitoring the extracted signal with a correction control block, and
      adjusting the analog correction and a digital residue, at the output of the primary analog-to-digital converter, based on the digital control generated using the extracted signal and fed back from the correction control block; and
   transferring a signal of interest from the low-intermediate frequency receiver to a first control unit wherein the first control unit prepares the signal of interest for displaying on a display device.

7. The method as claimed in claim 6 further comprising forming a digital correction signal, by an auxiliary analog-to-digital converter, monitored by the correction control block for determining the digital control including cancelling the digital residue in the extracted signal through a digital correction amplifier.

8. The method as claimed in claim 6 further comprising generating an interference image from the composite input including correcting the raw stream by applying an analog cancellation through an image formation amplifier coupled to the interference image.

9. The method as claimed in claim 6 further comprising modifying, through a residue cancellation adder, the extracted signal including activating a digital correction amplifier by manipulating a digital control from the correction control block for adjusting the digital correction amplifier.

10. The method as claimed in claim 6 further comprising adjusting, by an image formation amplifier, the composite input through an analog cancellation adder for creating the raw stream by further modifying the composite input through an adder.

11. A wireless communication system comprising:
    an antenna configured to receive a received signal;
    a quadrature mixer, coupled to the antenna, configured to generate a baseband output signal and an interference baseband signal;
    an adder, coupled to the quadrature mixer, configured to develop a raw stream based on combining the baseband output with an analog cancellation associated with an interference image and from an analog cancellation amplifier;
    a primary analog-to-digital converter, coupled to the adder, configured to develop an extracted signal based on sampling the raw stream; and
    a digital residue adder, coupled to the primary analog-to-digital converter, configured to generate a digital control based on the extracted signal, the digital control fed back to adjust the analog cancellation amplifier and a digital correction amplifier, configured to produce a digital residue, coupled to the output of the primary analog-to-digital converter.

12. The system as claimed in claim 11 further comprising an auxiliary analog-to-digital converter, coupled to the digital residue adder, configured to generate a digital residue.

13. The system as claimed in claim 11 further comprising a scaling amplifier, coupled to the quadrature mixer, configured to generate the digital residue from the received signal.

14. The system as claimed in claim 11 further comprising a residue cancellation adder, coupled to the digital residue adder, configured to modify the extracted signal by the digital correction amplifier.

15. The system as claimed in claim 11 further comprising an amplifier, coupled to the adder, configured to modify the raw stream.

16. The system as claimed in claim 11 further comprising a first control unit, coupled to the digital residue adder, the first control unit configured to display a signal of interest on a display device.

17. The system as claimed in claim 16 further comprising an auxiliary analog-to-digital converter, coupled to the digital residue adder, configured to generate a digital correction signal, the auxiliary analog-to-digital converter coupled to the digital correction amplifier configured to cancel the digital residue in the extracted signal.

18. The system as claimed in claim 16 further comprising an analog cancellation adder, coupled to the quadrature mixer, configured to generate the digital residue from the received signal includes the analog cancellation adder coupled to a scaling amplifier and an amplifier.

19. The system as claimed in claim 16 further comprising a residue cancellation adder, coupled to the digital correction amplifier, configured to modify the extracted signal includes a cancellation control manipulated by a correction accumulator to adjust the digital correction amplifier.

20. The system as claimed in claim 16 wherein the adder, coupled to the quadrature mixer, configured to modify the raw stream, includes an amplifier and the scaling amplifier between the quadrature mixer and the adder.

\* \* \* \* \*